(12) United States Patent
Grant

(10) Patent No.: US 6,361,257 B1
(45) Date of Patent: Mar. 26, 2002

(54) PARALLEL WAVE WASHER

(75) Inventor: Anthony J. Grant, Grafton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/455,631

(22) Filed: Dec. 7, 1999

(51) Int. Cl.⁷ ............................................... F16B 39/24
(52) U.S. Cl. ..................... 411/154; 411/147; 411/545
(58) Field of Search ................... 411/154, 155, 411/545, 156, 544, 157, 147

(56) References Cited

U.S. PATENT DOCUMENTS

| 236,624 | A | * | 1/1881 | Pratt |
| 249,151 | A |   | 11/1881 | Allen |
| 454,289 | A | * | 6/1891 | Partz |
| 1,135,597 | A | * | 4/1915 | Loutrel |
| 1,762,651 | A | * | 6/1930 | Chism |
| 1,773,286 | A |   | 8/1930 | Stanford |
| 1,977,602 | A |   | 10/1934 | Olson |
| 2,313,658 | A | * | 3/1943 | McGrew |
| 3,503,430 | A | * | 3/1970 | Tusurumoto |

FOREIGN PATENT DOCUMENTS

JP               63547      *  5/1977  .................. 411/155

* cited by examiner

*Primary Examiner*—Flemming Saether
(74) *Attorney, Agent, or Firm*—Lisa M. Soltis; Mark W. Croll; John P. O'Brien

(57) ABSTRACT

A parallel wave washer having a body member with an aperture disposed therethrough, a first groove and a first ridge are disposed across a first end of the body member, the first groove is spaced apart from the first ridge and is aligned parallel thereto, a second groove and a second ridge are disposed across an opposite second end of the body member, the second groove is located generally opposite and is aligned parallel to the first ridge, and the second ridge is located generally opposite and is aligned parallel to the first groove.

8 Claims, 3 Drawing Sheets

PARALLEL WAVE WASHER

BACKGROUND OF THE INVENTION

The invention relates generally to washers for use with bolts and nuts, and more particularly to improved wave washers.

Washers having a radial wave disposed on a circumferential portion thereof are known generally. The SPAK washer by ITW Shakeproof, Milwaukee, Wis. for example comprises a split ring lock washer having a single wave or undulation disposed thereabout and aligned radially with the washer axis. The wave configuration adds improved reactive tension and torque absorption characteristics to the sustaining locking tension of the split lock washer. The SPAK washers are employed in automotive and electronics assemblies among other applications.

The present invention is drawn toward novel washers.

An object of the invention is to provide novel washers that overcome problems in the art.

Another object of the invention is to provide novel washers that are reliable.

Another object of the invention is to provide novel washers that are economical.

A further object of the invention is to provide novel washers having generally improved performance characteristics.

Another object of the invention is to provide novel washers that may be manufactured cost effectively.

Yet another object of the invention is to provide novel washers having improved force versus deflection performance.

Still another object of the invention is to provide novel parallel wave washers, for example having a U-shape undulating profile, or an N-shape undulating profile or a W-shape undulating profile.

A more particular object of the invention is to provide novel washers comprising generally a substantially annular member having an undulating profile with at least one trough disposed or formed one end thereof and at least one ridge or crest formed on the other end thereof generally opposite the trough and aligned in parallel therewith.

Another more particular object of the invention is to provide novel washers comprising generally a body member having an aperture disposed therethrough, a first groove and a first ridge disposed across a first end of the body member, the first groove is spaced apart from the first ridge and is aligned parallel thereto, a second groove and a second ridge disposed across an opposite second end of the body member, the second groove is located generally opposite and is aligned parallel to the first ridge, and the second ridge is located generally opposite and is aligned parallel to the first groove.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 1b is a plan view of the first exemplary washer of FIG. 1a.

FIG. 2b is a plan view of the second exemplary washer of FIG. 2a.

FIG. 3b is a plan view of the third exemplary washer of FIG. 3a.

FIG. 4b is a plan view of the fourth exemplary washer of FIG. 4a.

DETAILED DESCRIPTION OF THE INVENTION

The washers of present invention comprise generally a substantially annular member having an undulating profile with at least one trough disposed on one side of the substantially annular member and aligned in parallel with at least one ridge disposed on an opposite side thereof. The washers of the present invention are thus referred to as parallel wave washers.

The undulating profile of the substantially annular member may take one of many forms, including for example a substantially U-shape undulating profile, or a substantially N-shape undulating profile, or a substantially W-shape undulating profile. Other embodiments may have alternative undulating profiles formed by additional parallel arrangements of troughs and ridges on opposites sides of the substantially annular member.

In the exemplary embodiments, the substantially annular member comprises generally a body member 2 having an aperture 3 therethrough for receiving a threaded bolt shaft or some other shank as is typical of washers. The substantially annular member also comprises generally opposites ends having corresponding surfaces that may be clamped, for example between a bolt head and a work surface, as is typical in washer applications.

Figure 1A:
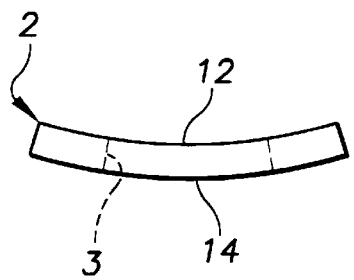
FIG. 1a is a first exemplary washer profile.

In the exemplary embodiment of FIG. 1a, the parallel wave washer comprises a first groove 12 disposed across a first end of the body member 2, and a second ridge 14 disposed across an opposite second end thereof. The first groove 12 is disposed generally opposite and parallel to the second ridge 14.

Figure 1B:
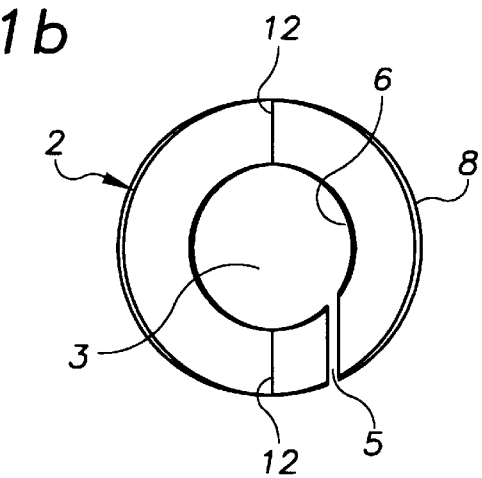

FIG. 1b illustrates the first groove 12 and the second ridge aligned in parallel and disposed fully across the body member 2. The washer in the exemplary embodiments of FIGS. 1a and 1b thus has a generally U-shape undulating profile, which is illustrated best in the non-sectional profile view of FIG. 1a.

In FIGS. 1a and 1b, the washer aperture 3 has a substantially central axis, which is generally perpendicular to the opposite ends of the body member 2. In the exemplary embodiments of FIGS. 1a and 1b, the first groove 12 and the second ridge 14 are disposed generally transversely through the washer axis so that the undulating profile of the washer is disposed substantially symmetrically thereabout. In alternative embodiments, the U-shape undulating profile of the washer may be configured asymmetrically about the washer axis.

Figure 2A:
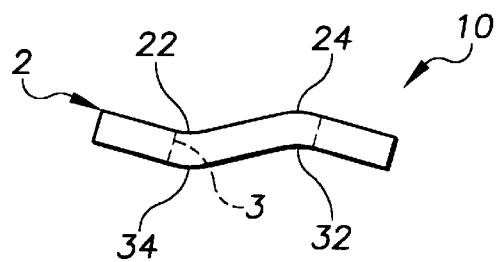
FIG. 2a is a second exemplary washer profile.

In the exemplary embodiment of FIG. 2a, the parallel wave washer comprises a first groove 22 and a first ridge 24, both of which are disposed across the first end of the body member 2. The first groove 22 is spaced apart from the first ridge 24 and is aligned parallel thereto. FIG. 2a also illustrates a second groove 32 and a second ridge 34, both disposed across the opposite second end of the body member. The second groove 32 is located generally opposite and parallel to the first ridge 24, and the second ridge 34 is located generally opposite and parallel to the first groove 22.

Figure 2B:
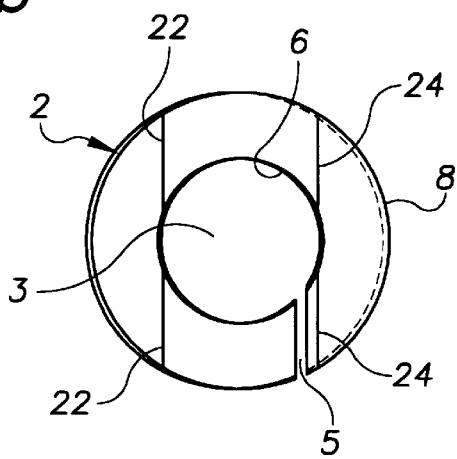

FIG. 2b illustrates the first groove 22 and the first ridge 24 aligned in parallel and disposed across the body member 2, rather than emanating radially from the central axis of the aperture as is known in prior art washers. The washer in the exemplary embodiments of FIGS. 2a and 2b thus has a generally N-shape undulating profile, which is illustrated best in the non-sectional profile view of FIG. 2a.

In FIGS. 2a and 2b, the washer aperture 3 has a substantially central axis, which is generally perpendicular to the opposite ends of the body member 2. The first groove 22 and the second ridge 34 are disposed on one side of the axis and the first ridge 24 and the second groove 32 are disposed on another side of the axis, generally transversely thereto and approximately equal distances therefrom. In alternative embodiments, the ridges and grooves of the washer may be located asymmetrically about, in other words at different distances from, the washer axis.

Figure 3A:
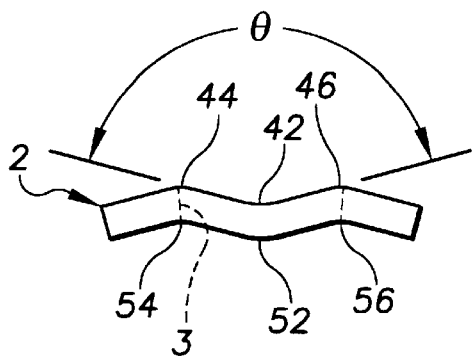
FIG. 3a is a third exemplary washer profile.

In the exemplary embodiment of FIG. 3a, the parallel wave washer comprises a first groove 42, a first ridge 44 and a third ridge 46, all of which are aligned in parallel and disposed across the first end of the body member 2. The first groove 42 is disposed between and spaced apart from both the first and third ridges 44 and 46. FIG. 3a also illustrates a second ridge 52, a second groove 54 and a third groove 56, all of which are aligned in parallel and disposed across the second end of the body member 2.

The first groove 42 is disposed generally opposite and parallel to the second ridge 52, the first ridge 44 is disposed generally opposite and parallel to the second groove 54, and the third ridge 46 is disposed parallel to and generally opposite the third groove 56.

Figure 3B:
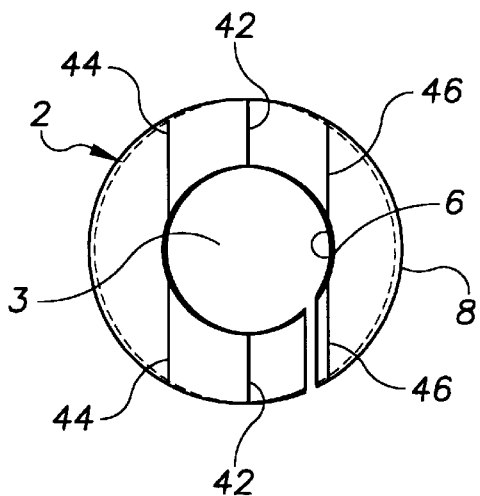

FIG. 3b illustrates the first and third ridges 44 and 46 and the first groove 42 aligned in parallel and disposed across the first end of the body member 2, rather than emanating radially from the central axis thereof as is known in prior art washers. The washer in the exemplary embodiments of FIGS. 3a and 3b thus has a generally W-shape undulating profile, which is illustrated best in the non-sectional profile view of FIG. 3a.

In FIGS. 3a and 3b, the washer aperture 3 has a substantially central axis, which is generally perpendicular to the opposite ends of the body member 2. The first ridge 44 and the opposite second groove 54 disposed on one side of the axis, and the third ridge 46 and the opposite third groove 56 disposed on another side of the axis, approximately equal distances therefrom. The first groove 42 and the second ridge 52 are disposed generally transversely through the washer axis so that the undulating profile of the washer is disposed substantially symmetrically thereabout. In alternative embodiments, the ridges and grooves of the washer may be configured asymmetrically about the washer axis.

Figure 4A:
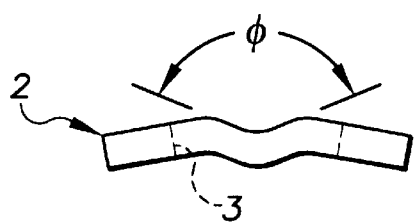
FIG. 4a is a fourth exemplary washer profile.
Figure 4B:
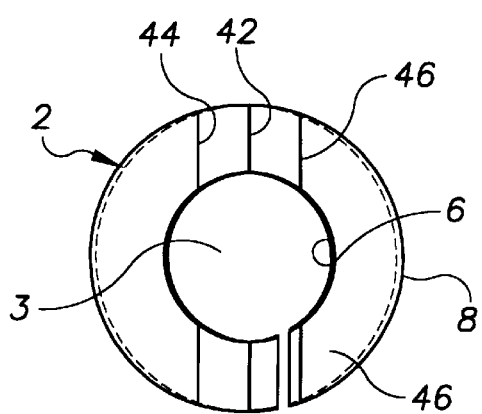

The parallel wave washer embodiments of FIGS. 4a and 4b have generally the same W-shape undulating profile as the washers of FIGS. 3a and 3b. The washers are distinguished, however, by differing angular configurations. More particularly, the parallel wave washer of FIG. 3a has a greater angle θ, which is an angular measure between portions of the body member extending from the first groove 42 to the first and third ridges 44 and 46, whereas the same angular measure φ in FIG. 4a is less than in FIG. 3a.

The differing angular configurations of the parallel wave washers of FIGS. 3a and 4a results in differing performance. The parallel wave washer of FIG. 4a for example is relatively rigid and requires the application of a greater compression force thereto to flatten or deflect the washer in comparison to the washer of FIG. 3a.

The body member of the parallel wave washers of the present invention is a substantially annular ring, which may be continuous or split. All of the exemplary embodiments illustrate substantially annular split rings, and more particularly include an opening or gap 5 between radially inner 6 and outer 8 sides of the substantially annular member. In the exemplary embodiments, the opening or gap is aligned substantially parallel with the grooves and ridges, but in other alternative embodiments the gap may be aligned at some angle relative thereto or along a radial emanating from the central axis of the washer.

The parallel wave washers of the present invention are preferably fabricated of a metal material, although other materials may also be used, as is typical of washers. The undulating profile having the parallel waves may be fabricated by roll forming operations, which are highly cost effective.

Figure 5:
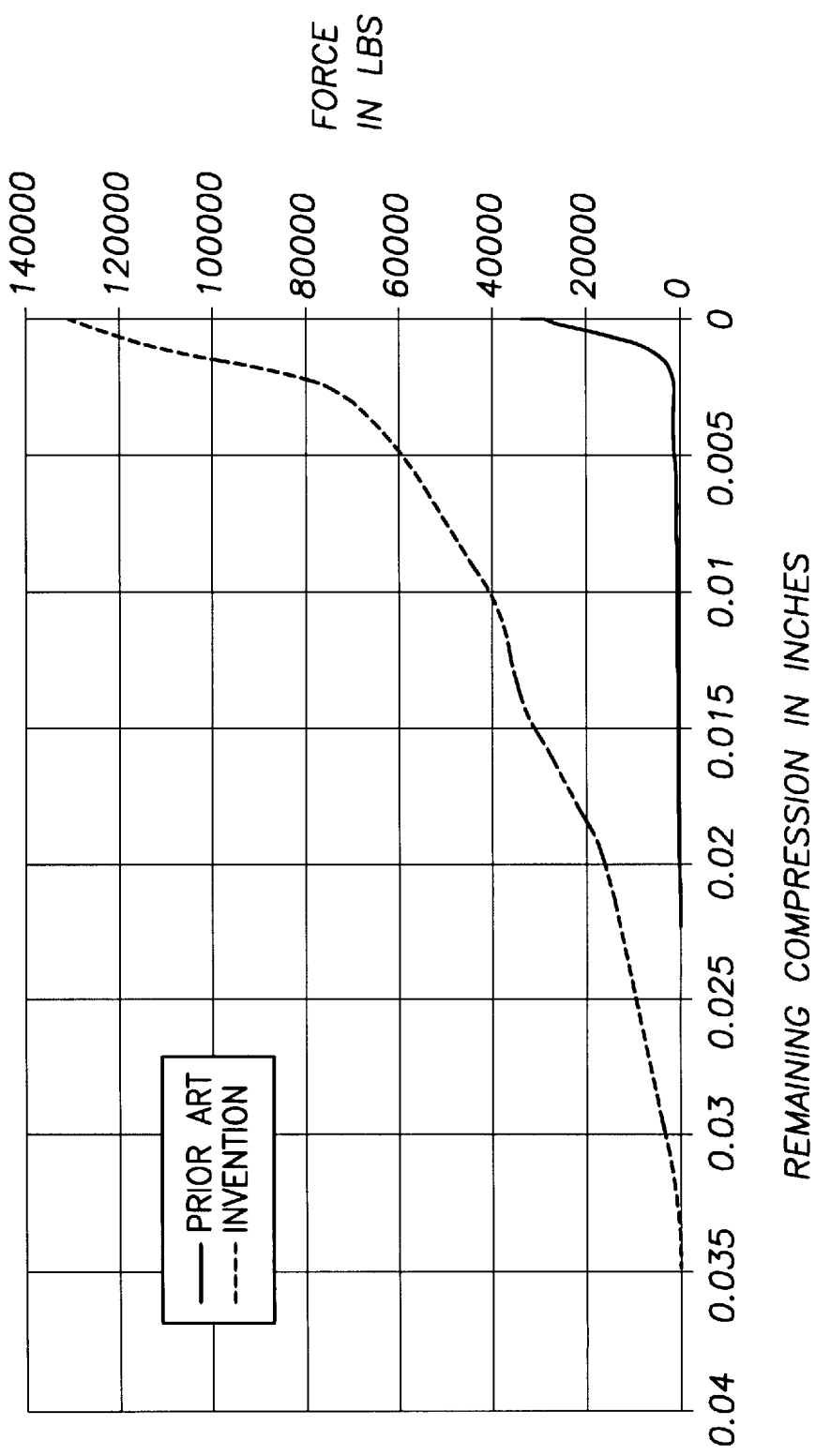
FIG. 5 is a graphical comparison of a parallel wave washer according to the present invention and a known prior art radial wave washer.

FIG. 5 illustrates a force versus deflection curve for a parallel wave washer having the W-shape undulating profile configuration illustrated in the exemplary embodiments of FIGS. 3a and 3b in comparison to a prior art SPAK washer by ITW Shakeproof, Milwaukee, which is a radial wave washer. Those of ordinary skill in the art will recognize from the comparative force versus deflection curves of FIG. 5 that performance of the parallel wave washer of the present invention is remarkably improved in comparison to that of the prior art radial wave washer.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A washer comprising:
    a body member having a first end and an opposite second end;
    an aperture disposed through the body member;
    a first groove and a first ridge disposed across the first end of the body member, the first groove spaced apart from the first ridge and parallel thereto;
    a second groove and a second ridge disposed across the second end of the body member, the second groove generally opposite and parallel to the first ridge, the second ridge generally opposite and parallel to the first groove,
    the body member having a generally N-shaped profile, the aperture having a substantially central axis, the first groove and the second ridge disposed on one side of the axis and the first ridge and the second groove disclosed on another side of the axis.

2. The washer of claim 1, the body member is substantially annular split ring, the split ring forms first and second oppositely facing portions aligned without an axial offset therebetween, the gap is parallel with the ridges and grooves.

3. The washer of claim 1, the body member is a substantially annular ring.

4. The washer of claim 1 is metal.

5. A washer comprising:
a body member having a first end and an opposite second end;
an aperture disposed through the body member;
a first groove and a first ridge disposed across the first end of the body member, the first groove spaced apart from the first ridge and parallel thereto;
a second groove and a second ridge disposed across the second end of the body member, the second groove generally opposite and parallel to the first ridge, the second ridge generally opposite and parallel to the first groove,
the body member having a generally N-shaped profile;
the body member is a substantially annular split ring, the split forms first and second oppositely facing portions aligned without an axially offset therebetween, the gap is parallel with the ridges and grooves.

6. The washer of claim 5, the aperture having a substantially central axis, the first groove and the second ridge disposed on one side of the axis and the first ridge and second groove disposed on another side of the axis.

7. The washer of claim 5, the body member is a substantially annular ring.

8. The washer of claim 5, is a metal.

* * * * *